US006981127B1

(12) United States Patent
Singh et al.

(10) Patent No.: US 6,981,127 B1
(45) Date of Patent: Dec. 27, 2005

(54) APPARATUS AND METHOD FOR ALIGNING VARIABLE-WIDTH INSTRUCTIONS WITH A PREFETCH BUFFER

(75) Inventors: Balraj Singh, Morgan Hill, CA (US); Venkat Mattela, San Jose, CA (US)

(73) Assignee: Infineon Technologies North America Corp., San Jose, CA (US)

(*) Notice: Subject to any disclaimer, the term of this patent is extended or adjusted under 35 U.S.C. 154(b) by 0 days.

(21) Appl. No.: 09/320,833

(22) Filed: May 26, 1999

(51) Int. Cl.[7] .............................................. G06F 13/00
(52) U.S. Cl. ..................... 712/204; 712/206; 712/207; 712/215; 710/55; 710/56
(58) Field of Search ............................... 712/204, 206, 712/215, 207; 710/55, 56

(56) References Cited

U.S. PATENT DOCUMENTS 4,811,284 A * 3/1989 Adler et al. .................. 710/56
5,581,718 A * 12/1996 Grochowski ............... 712/206
5,644,744 A 7/1997 Mahin et al.
5,680,564 A * 10/1997 Divivier et al. ............ 712/205
5,822,559 A 10/1998 Narayan et al.
5,835,967 A * 11/1998 McMahan .................. 711/213
5,854,911 A * 12/1998 Watkins ...................... 712/207
5,909,566 A * 6/1999 Cai et al. .................... 712/207
6,122,729 A * 9/2000 Tran .......................... 712/244
6,202,142 B1 * 3/2001 Narayan et al. ........... 712/204

* cited by examiner

*Primary Examiner*—Gautam R. Patel
(74) *Attorney, Agent, or Firm*—Fish & Richardson P.C.

(57) ABSTRACT

A method and apparatus for providing a plurality of aligned instructions from an instruction stream provided by a memory unit for execution within a pipelined microprocessor is described. The microprocessor comprises a prefetch buffer, whereby the prefetch buffer stores prefetched instructions and additional information about the validity and size of the prefetch buffer. The method and apparatus use the prefetch buffer to buffer a part of an instruction stream. The actually aligned instruction stream is issued from the prefetch buffer or directly by instructions fetched from the memory, or from a combination of prefetched instructions and actually fetched instructions.

11 Claims, 4 Drawing Sheets

| Buffer 0 | | | | Buffer 1 | | | | Multiplexer | | | | | | | |
|---|---|---|---|---|---|---|---|---|---|---|---|---|---|---|---|
| V | Size | | Age | V | Size | | Age | A | B | C | D | E | F | G | H |
| 0 | – | – | – | 0 | – | – | – | 1 | 1 | 1 | 1 | 1 | 2 | 3 | 4 |
| 0 | – | – | – | 1 | 0 | 0 | 0 | 3 | 3 | 3 | 3 | 1 | 2 | 3 | 4 |
| | | | | 1 | 0 | 1 | 0 | 3 | 3 | 3 | 1 | 4 | 1 | 2 | 3 |
| | | | | 1 | 1 | 0 | 0 | 3 | 3 | 1 | 1 | 3 | 4 | 1 | 2 |
| | | | | 1 | 1 | 1 | 0 | 3 | 1 | 1 | 1 | 2 | 3 | 4 | 1 |
| 1 | 0 | 0 | 0 | 0 | – | – | – | 2 | 2 | 2 | 2 | 1 | 2 | 3 | 4 |
| 1 | 0 | 1 | 0 | 0 | – | – | – | 2 | 2 | 2 | 1 | 4 | 1 | 2 | 3 |
| 1 | 1 | 0 | 0 | 0 | – | – | – | 2 | 2 | 1 | 1 | 3 | 4 | 1 | 2 |
| 1 | 1 | 1 | 0 | 0 | – | – | – | 2 | 1 | 1 | 1 | 2 | 3 | 4 | 1 |
| 1 | 0 | 0 | 0 | 1 | 0 | 0 | 1 | 2 | 2 | 2 | 2 | 1 | 2 | 3 | 4 |
| 1 | 0 | 1 | 0 | 1 | 0 | 0 | 1 | 2 | 2 | 2 | 3 | 4 | 1 | 2 | 3 |
| 1 | 1 | 0 | 0 | 1 | 0 | 0 | 1 | 2 | 2 | 3 | 3 | 3 | 4 | 1 | 2 |
| 1 | 1 | 1 | 0 | 1 | 0 | 0 | 1 | 2 | 3 | 3 | 3 | 2 | 3 | 4 | 1 |
| 1 | 0 | 0 | 1 | 1 | 0 | 0 | 0 | 3 | 3 | 3 | 3 | 1 | 2 | 3 | 4 |
| 1 | 0 | 0 | 1 | 1 | 0 | 1 | 0 | 3 | 3 | 3 | 2 | 4 | 1 | 2 | 3 |
| 1 | 0 | 0 | 1 | 1 | 1 | 0 | 0 | 3 | 3 | 2 | 2 | 3 | 4 | 1 | 2 |
| 1 | 0 | 0 | 1 | 1 | 1 | 1 | 0 | 3 | 2 | 2 | 2 | 2 | 3 | 4 | 1 |

FIG. 6

APPARATUS AND METHOD FOR ALIGNING VARIABLE-WIDTH INSTRUCTIONS WITH A PREFETCH BUFFER

BACKGROUND OF THE INVENTION

The present invention is related to a method and an arrangement for prefetching and aligning an instruction stream provided by a memory unit. Modern microprocessors have the ability of executing multiple instructions in parallel. Such microprocessors usually have a pipelined structure and comprise multiple execution units to execute instructions in parallel. For example, a microprocessor might have a load and store execution unit for performing load and store instructions and an arithmetic logic unit for executing data manipulating instructions. Furthermore, a 32-bit microprocessor might be able to execute instructions with variable lengths, for example, 16-bit instructions and 32-bit instructions.

To provide such a pipelined structure with the respective instructions from memory, usually a request is made to the memory unit. The memory unit has to load the respective number of instructions from the memory and provide the fetch unit with those instructions. As memory systems are usually slow compared to execution units, such an arrangement forms a bottleneck in the execution of instructions. Especially when it comes to a so-called boundary crossing, memory systems can not retrieve the requested data/instructions within one single access. A memory system is usually organized in lines and columns. Only a single line can be accessed at a time. Therefore, if the start and end addresses of a requested instruction stream lie not within a single line, the memory system will retrieve the requested instructions partly from one memory line and partly from the following memory line. Therefore, the memory system needs additional cycles until all information is retrieved.

SUMMARY OF THE INVENTION

It is therefore an object of the present invention to provide a method and apparatus for providing a plurality of aligned instructions from an instruction stream.

This object is achieved by a method and an apparatus for providing a plurality of aligned instructions from an instruction stream provided by a memory unit for execution within a pipelined microprocessor is described. The microprocessor comprises one or more prefetch buffers, whereby the prefetch buffers store prefetched instructions and additional information about the validity and size of the prefetch buffer. The method and apparatus use the prefetch buffers to buffer a part of an instruction stream of a program. The aligned instruction stream is assembled either from the prefetch buffers or directly by instructions fetched from the memory, or from a combination of prefetched instructions and actually fetched instructions.

In one method for providing a plurality of aligned instructions from an instruction stream provided by a memory unit for execution within a pipelined microprocessor according to the present invention, the microprocessor comprises a prefetch buffer, whereby the prefetch buffer stores prefetched instructions and additional information about the amount of valid data in the prefetch buffer. The method comprises the steps of:

in case the prefetch buffer containing invalid data:

a) requesting an instruction stream and storing the instruction stream in the prefetch buffer;

b) setting the data for validity in the prefetch buffer;

c) issuing a requested number of instructions from the requested instruction stream;

d) depending on how many instructions are issued, reducing the size data in the prefetch buffer, respectively;

e) invalidating the validity data if all instructions from the prefetch buffer have been issued;

in case the prefetch buffer contains valid data:

f) issuing a requested number of instructions from the prefetch buffer;

g) depending on how many instructions are issued, reducing the size data in the prefetch buffer, respectively;

h) invalidating the validity data if all instructions from the prefetch buffer have been issued.

A second method according to the present invention for providing a plurality of aligned instructions from an instruction stream provided by a memory unit for execution within a pipelined microprocessor comprises a first and second prefetch buffer, whereby said prefetch buffers store prefetched instructions and additional information about the amount of valid data of said prefetch buffers. This method comprises the steps of:

in case both of the prefetch buffers contain invalid data:

a) requesting an instruction stream and storing the instruction stream in the first prefetch buffer;

b) setting the data for validity in the first prefetch buffer;

c) issuing a requested number of instructions from the requested instruction stream;

d) depending on how many instructions are issued, reducing the size data in the first prefetch buffer;

e) invalidating the validity data if all instructions from the first prefetch buffer have been issued;

in case one or both of the prefetch buffers contains valid data:

f) issuing a requested number of instructions from one prefetch buffer;

g) depending on how many instructions are issued, reducing the size data in the one prefetch buffer;

h) invalidating the validity data if all instructions from the one prefetch buffer have been issued.

An apparatus according to the present invention for providing a plurality of aligned instructions from an instruction stream provided by a memory unit for execution within a pipelined microprocessor comprises:

a first prefetch buffer coupled with the memory unit, whereby the first prefetch buffer stores prefetched instructions and additional information about the validity and size of the first prefetch buffer, a first plurality of multiplexers with inputs coupled with the first prefetch buffer and the memory unit for selecting a certain number of instructions and with outputs, a second plurality of multiplexers with inputs coupled with the outputs of the first multiplexers for aligning the selected instructions.

This apparatus can easily be extended to comprise a second or more prefetch buffers to cache a part of the instruction stream of a program. The length of the prefetched instruction stream depends on the size of the prefetch buffers.

The prefetch buffers comprise preferably a data field for storing of additional control data, such as, validity, size of the non-issued instructions of the stored instruction stream, and age indicating which prefetch buffer contains older data.

An alignment unit can be easily formed by either multiplexers, shifters or barrel shifters. As in the preferred embodiments only a right shift occurs, multiplexers can be used instead of a shifter. Of course, the shifter can operate in both ways, left shift and right shift, for example, depending on the age of the data.

BRIEF DESCRIPTION OF THE DRAWINGS

FIG. 6 shows a table indicating how the multiplexers according to FIG. 1 are switched.

DESCRIPTION OF THE EMBODIMENTS OF THE PRESENT INVENTION

Figure 1:
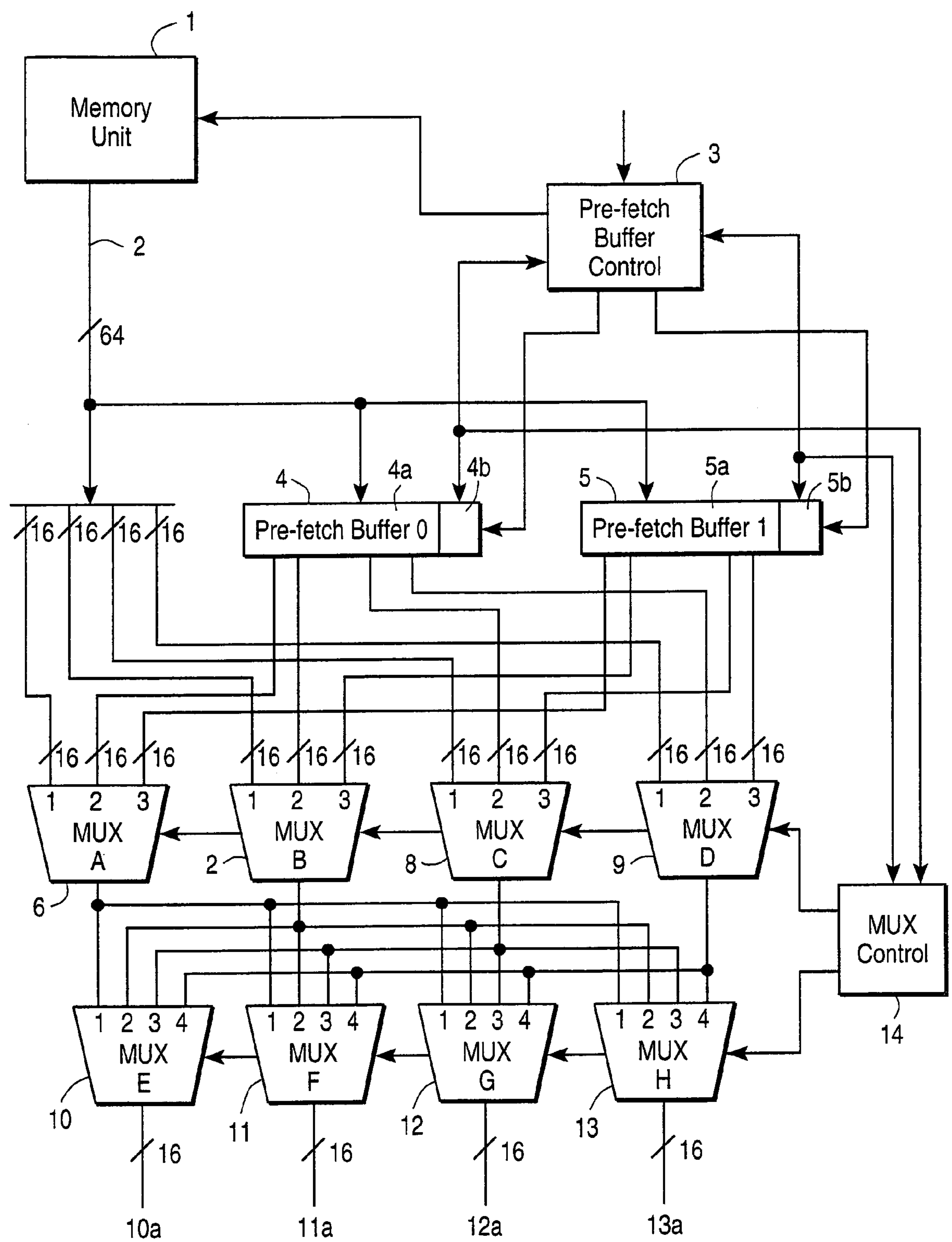
FIG. 1 shows a block diagram of a first embodiment according to the present invention.

According to FIG. 1, a memory unit 1 stores a program to be executed with a plurality of sequentially stored instructions. Memory unit 1 has an output consisting of 64-bit lines. The memory is arranged in lines and columns, whereby the line size defines the maximum size of data that can be accessed in parallel. In this embodiment, the line size is 256 bit and the output size of the memory system is 64 bit, which reduces the probability of a boundary crossing. Whenever a request for providing further instructions is transmitted to memory unit 1, it provides an aligned instruction stream consisting of 8 bytes or 64 bits. Depending on the bus width of the memory unit an arrangement with more or less bits can be implemented. The access time is usually determined by speed of the memory, by the fact whether the stored instructions are aligned, and by any boundary crossing and can be as fast as one cycle. Therefore, in this embodiment every request for further instructions will always produce a 64 bit instruction stream which can be aligned in case of a linear program sequence or unaligned in case of branches to an address being different from a multiple of 64. If a boundary crossing occurs an additional delay takes place until all requested instructions are retrieved by the memory system. Therefore, besides access speed of the memory, a necessary alignment or a request in case of a boundary crossing might take additional time and slow down the fetching of instructions.

According to the present invention a special prefetch buffer arrangement is provided. A prefetch buffer control unit 3 provides memory unit 1 with respective instruction start addresses. A first prefetch buffer 4 is provided which is controlled by prefetch buffer control unit 3. A second prefetch buffer 5 is provided which is also controlled by prefetch buffer control unit 3. Both prefetch buffers 4 and 5 have a portion 4*a*, 5*a* for storing 64 bits of an instruction stream and a second portion 4*b*, 5*b* for control information. The first portion 4*a*, 5*a* is coupled with the output 2 of memory unit 1. The second portion 4*b*, 5*b* is coupled with prefetch buffer control unit 3, respectively. Four multiplexers 6, 7, 8 and 9 with three 16-bit inputs and one 16-bit output are provided. The output 2 of memory unit 1 is split into four 16-bit sub-bus. Each 16-bit sub-bus is coupled with a first input of multiplexers 6, 7, 8 and 9, respectively. In a similar manner, the contents of prefetch buffer 4 and prefetch buffer 5 are split into four 16-bit portions. Each 16-bit portion of prefetch buffer 4 is coupled with the second inputs of multiplexers 6, 7, 8 and 9, respectively. Each 16-bit portion of prefetch buffer 5 is in a similar way coupled with the third inputs of each multiplexer 6, 7, 8 and 9, respectively. A second set of four multiplexers 10, 11, 12 and 13 with three 16-bit inputs and one 16-bit output is provided. The first input of each multiplexer 10, 11, 12 and 13 is coupled with the output of multiplexer 6. The second input of each multiplexer 10, 11, 12 and 13 are coupled with the output of multiplexer 7. In the same way, the third and fourth inputs of multiplexers 10, 11, 12 and 13 are coupled with the outputs of multiplexers 8 and 9, respectively. The outputs of multiplexers 10, 11, 12 and 13 provide the aligned instruction stream which is fed to the respective de-coding units of the pipeline structure. A multiplexer control unit 14 is provided to control multiplexers 6, 7, 8, 9, 10, 11, 12 and 13. Multiplexer control unit 14 is also coupled with control bits of the second portion 4*b*, 5*b* of prefetch buffers 4 and 5.

Figure 2:
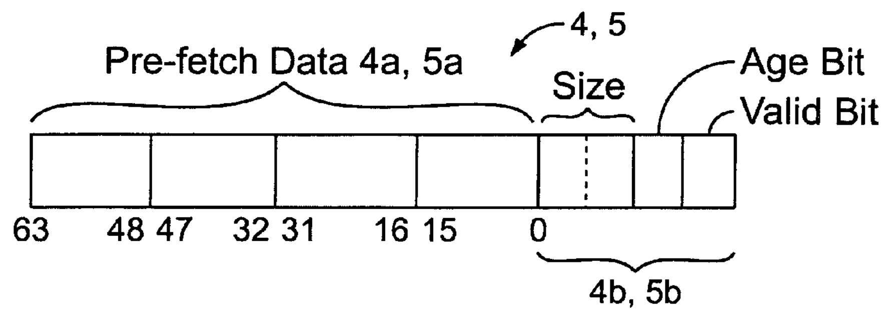
FIG. 2 shows the structure of a prefetch buffer according to the present invention.

FIG. 2 shows how each prefetch buffer 4, 5 is structured. The first portion of prefetch buffers 4, 5 consists of 64 bits of instruction data divided into four groups, namely, bits 0–15, bits 16–31, bits 32–47, and bits 48–63. The second portion 4*b*, 5*b* of prefetch buffer 4, 5 provides a valid bit, indicating the validity of a data entry in the first portion 4*a*, 5*a*. A second bit, the so-called age bit, indicates which prefetch buffer 4 or 5 contains older data. Two further bits are provided to indicate how many 16-bit words of the stored instructions in first portion 4*a*, 5*a* have been previously issued.

Figure 3:
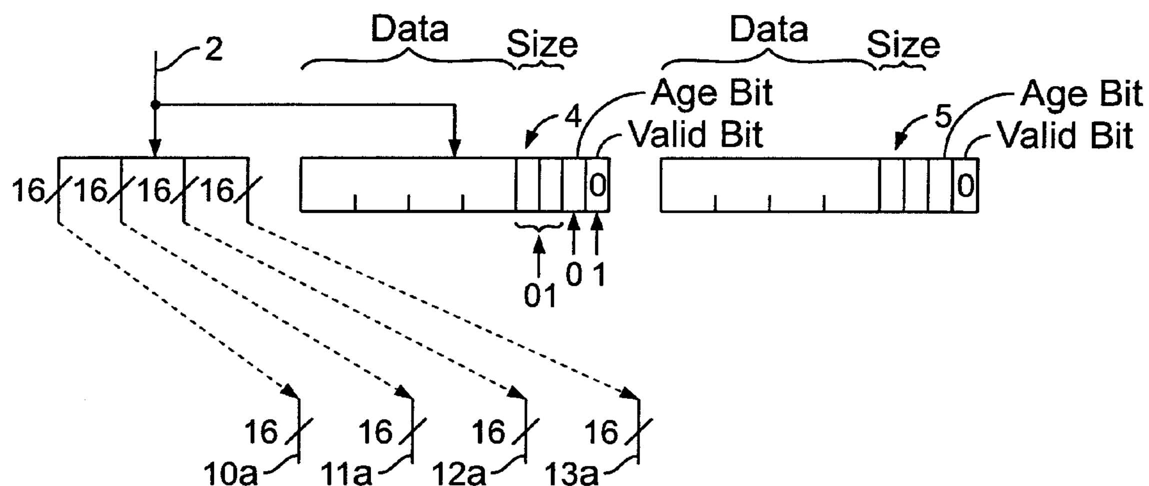
FIG. 3 shows how the instructions are distributed in a first example.

The function of the embodiment shown in FIG. 1 will now be explained in detail in combination with FIGS. 3, 4 and 5. It is assumed, that a microprocessor having an arrangement according to FIG. 1 is able to issue either one 16-bit instruction, or two 16-bit instructions, or one 16-bit instruction and one 32-bit instruction, or two 32-bit instructions. Therefore, depending upon how many bytes of an instruction stream have been issued, the following scenarios may take place. At the beginning of the execution of a program, according to FIG. 3, both prefetch buffers contain invalid data which is indicated by a zero in the valid bit location of each prefetch buffer 4, 5. Therefore, a request for providing 64 bits of instructions is forwarded to memory unit 1. Memory unit 1 provides the first instruction stream at its output 2. Prefetch buffer control unit 3 controls prefetch buffer 4 to store the provided instruction stream in the first portion 4*a* of prefetch buffer 4. Multiplexers 6, 7, 8 and 9 are all switched to input 1 to carry the instruction stream provided by memory unit 1 at its respective outputs. Multiplexer 10 is switched to input 1, multiplexer 11 is switched to input 2, multiplexer 12 is switched to input 3, and multiplexer 13 is switched to input 4. Therefore, the outputs 10*a*, 11*a*, 12*a* and 13*a* of multiplexers 10, 11, 12 and 13 carry the same output signals as output 2 of memory unit 1.

It will now be assumed that only one 16-bit instruction of the provided instruction stream can be executed. Therefore, prefetch buffer control unit 3 writes a "1" into valid bit of prefetch buffer 4, a "0" into the age bit of the second portion 4*b* of prefetch buffer 4 and a "01" into the size field of the second portion 4*b* of prefetch buffer 4. The second portion 4*b* of prefetch buffer 4 indicates now that valid data is stored in the first portion 4*a* of prefetch buffer 4 and that the first 16-bit word of the stored instruction stream has been issued.

Figure 4:
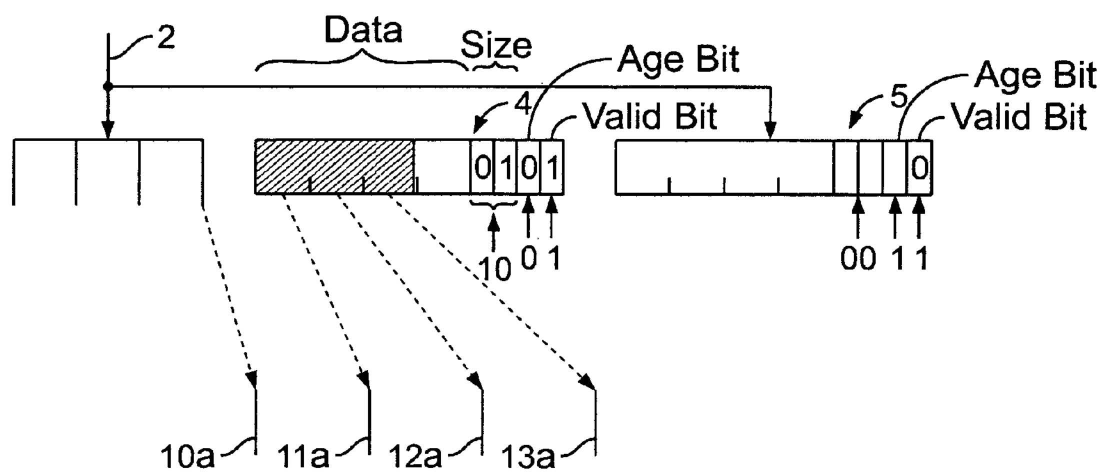
FIG. 4 shows how the instructions are distributed in a second example.
Figure 5:
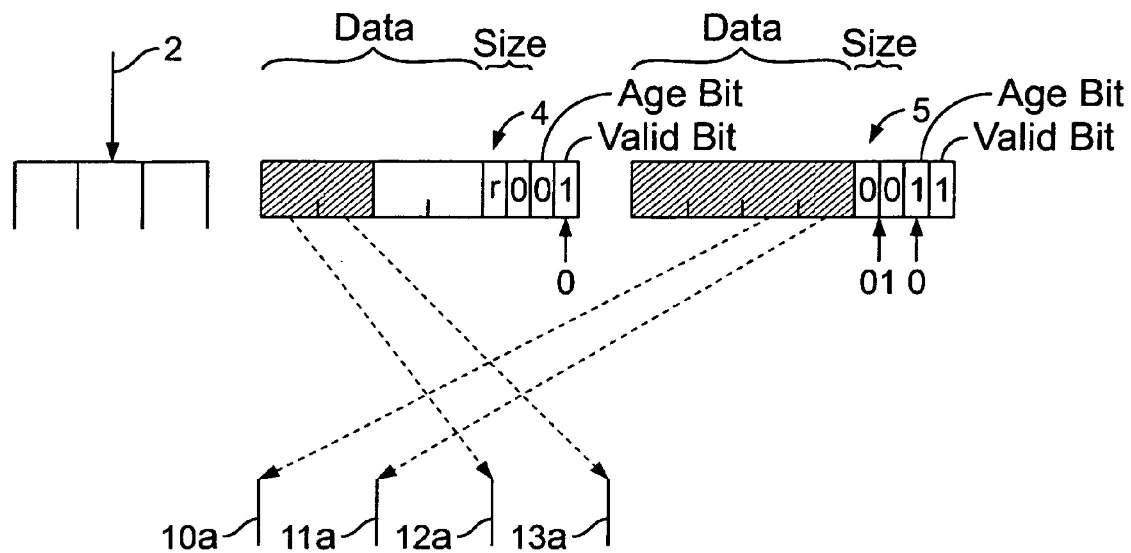
FIG. 5 shows how the instructions are distributed in a third example.

Further assuming that in the following cycle only one more 16-bit instruction can be issued, the following scenario would take place as shown in FIG. 4. Again, as prefetch buffer 5 is empty, a request for providing a further 64-bit instruction stream is transferred to memory unit 1. Memory unit 1 provides output 2 with a new instruction stream which is sequential to the first instruction stream and which will be stored in the second prefetch buffer 5. Valid bit of the second portion **5*b* of prefetch buffer 5 is set to "1", age bit is set to "1" indicating younger data than prefetch buffer 4, and size bit is set to "0", indicating that no instructions have been issued from the second prefetch buffer 5. As prefetch buffer 4 indicates that only one 16-bit word of stored instruction stream has been issued, multiplexer 8 will be switched to input 2 to provide bits 16–31 of prefetch buffer 4 at its output. In the same manner, multiplexers 7 and 6 will be switched to input 2 to carry bits 32–47 and 48–63 at its respective outputs. Multiplexer 9 is switched to input 1 to provide the first 16 bits of the instruction stream provided by memory unit 1. To align this instruction stream, multiplexer 13 is switched to input 3, multiplexer 12 is switched to input 2, multiplexer 11 is switched to input 1 and multiplexer 10 is switched to input 4. Thus, an aligned instruction stream starting with bit 16 of prefetch buffer 4 is available at the output 10*a*, 11*a*, 12*a* and 13*a***.

As mentioned before, if only one 16-bit instruction is issued in this cycle, the size bit of the second portion **4*b* of prefetch buffer 4 will be set to "10" indicating that all in all two 16-bit words of the stored instruction stream have been issued. In portion 5*b* of prefetch buffer 5 the valid bit remains "1", the age bit remains "1" indicating younger data than prefetch buffer 4 and the size field remains "0" indicating that so far no instruction from the instruction stream stored in the first portion 5*a* of prefetch buffer 5** has been issued.

In the following cycle, no request to memory unit 1 will be made as both prefetch buffers contain valid data and therefore more than 64 bits of instructions are available. FIG. 5 shows how the multiplexers will be switched in the following cycle. Multiplexers 6 and 7 will be switched to input 2 and multiplexers 8 and 9 will be switched to input 3. Multiplexer 10 will be switched to input 3, multiplexer 11 will be switched to input 4, multiplexer 12 will be switched to input 1 and multiplexer 13 to input 2. Again, a maximum of 64 bits of an aligned instruction stream is available at the outputs **10*a*, 11*a*, 12*a* and 13*a*. Depending upon how many 16-bit words will be issued, the respective control bits in the second portion of prefetch buffer 4 and 5 will be set. For example as shown in FIG. 5, if one 16-bit instruction and one 32-bit instruction will be issued in the following cycle, then the valid bit of prefetch buffer 4 will be set to "0" because all instructions stored in the first portion 4*a* of prefetch buffer 4 have been issued. Furthermore, the size bit field of the second portion 5*b* of prefetch buffer 5 will be set to "01" indicating that one 16-bit word of the instruction stream stored in the first portion 5*a* of prefetch buffer 5 has been issued. Finally, the age bit will be set to "0" as prefetch buffer 5** now stores the oldest data.

Unless a branch instruction requests a non-sequential instruction address, a 64 bit instruction stream will always be present either directly from memory unit 1 or from one or both prefetch buffers 4, 5. If a minimum of one instruction is issued, then at least 16 bit of the stored instruction stream of one prefetch buffer will be issued. Therefore, a scenario in which both prefetch buffers are fully loaded can only occur if the pipelines are stalled and cannot accept new instructions. If a minimum of one issued instruction is guaranteed, then the age bit is usually redundant and can be extracted from the two size bit fields. The prefetch buffer whose size bit is different from "00" is the prefetch buffer with the older instruction stream.

FIG. 6 shows a table containing all possible scenarios of how the multiplexers have to be switched. FIG. 6 also shows scenarios in which both prefetch buffers 4 and 5 contain valid data and both size fields are set to "0" indicating that no instruction of either prefetch buffer has been issued. Such a scenario is only possible if an additional request for providing a new instruction stream to memory unit 1 is executed immediately after issuing instructions or if no instruction can be issued due to stalled pipelines. An additional request can be done especially if there is additional time left between the issuing of any instructions and the next fetching of instructions at any time after the issuing. Preferably, this is done after setting the additional information in one or both prefetch buffers 4, 5. By this time it is exactly known whether one or both prefetch buffers 4, 5 are empty. Thus, every time instructions are issued, and one or both prefetch buffers are empty, as indicated by the valid bit, a request to memory unit 1 would provide a further 64-bit instruction stream which would be stored in one of the prefetch buffers 4 or 5. This embodiment ensures that at the time of the next request in most cases besides any branch instructions, both prefetch buffers 4 and 5 contain valid data.

As mentioned before, the arrangement according to FIG. 1 can provide instructions only during sequential execution of an instruction stream. In case of a branch instruction, the valid bit of both prefetch buffer 4 and 5 have to be set to "0" indicating invalid data. A branch prediction unit can provide the respective address to prefetch buffer control unit 3 to provide a new instruction stream. In case of a sequential instruction execution, the embodiments described according to FIG. 1 provide efficient means for providing an aligned instruction stream to the decoding units of the respective pipelines in a multi-pipeline system and can compensate speed losses due to boundary crossings or slow memory systems.

Figure 7:
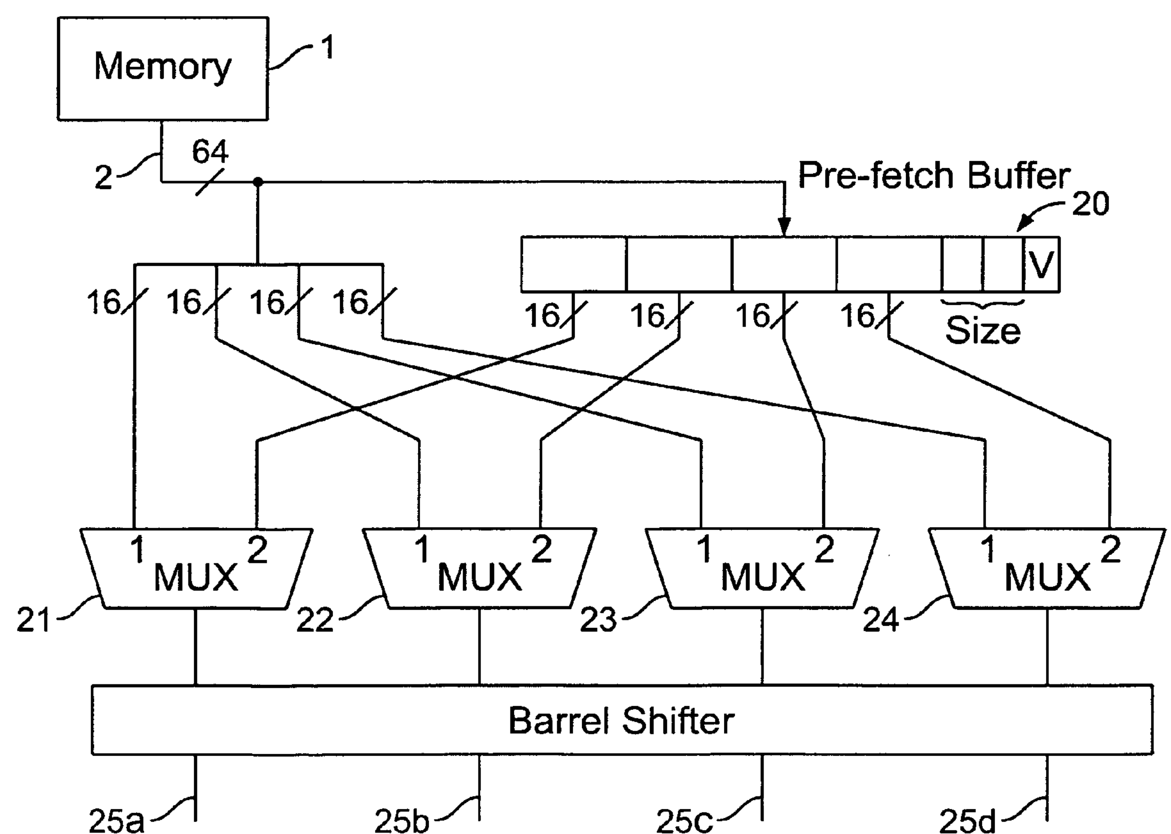
FIG. 7 shows a second embodiment according to the present invention.

FIG. 7 shows a second embodiment according to the present invention. This embodiment is a simplified version of the arrangement according to FIG. 1. In this embodiment, only one prefetch buffer 20 is provided. The second portion of prefetch buffer 20 contains only a valid bit and a size bit field. Memory 1 has an output 2 having 64 bit lines which is split into 4 16 bit sub-busses. Four multiplexers having two 16-bit inputs and one 16-bit outputs are provided. The first inputs of multiplexers 21, 22, 23 and 24 are coupled with one of the 16 bit lines of memory output 2. The second inputs of multiplexers 21, 22, 23 and 24 are coupled with a respective 16 bit field of prefetch buffer 20. The outputs of multiplexer 21, 22, 23 and 24 are coupled with the input of a 64-bit barrel shifter 24. Instead of barrel shifter 25, an arrangement including multiplexer 10, 11, 12 and 13 according to FIG. 1 can be used.

If memory 1 is fast enough and boundary crossing has only a minor influence, only one prefetch buffer 20 is necessary to align an instruction stream. If prefetch buffer 20 is empty a request to memory 1 for a following 64-bit instruction stream will provide an instruction stream at output 2 which is aligned and can be forwarded to output **25*a*, 25*b*, 25*c* and 25*d* through multiplexers 21, 22, 23, 24 and barrel shifter 25. The instruction stream will be stored in parallel in prefetch buffer 20. Depending on how many 16 bit words of the instruction stream will be issued, the instruction stream in a following cycle has to be aligned. In the following cycle, memory unit 1 provides a further 64-bit instruction stream which will be combined with the non-issued part of the instruction stream stored in prefetch buffer 20. As long as prefetch buffer 20 contains valid data indicated by the valid bit, the address of the requested instruction stream from memory unit 1 remains constant. Once the valid bit of prefetch buffer 20 is set to zero, indicating all stored instructions have been issued, a sequential instruction stream provided by memory unit 1 will be stored in prefetch buffer 20. The size bit field of prefetch buffer 20 is set according to how many 16-bit words of the instruction stream provided by memory 1** have been issued.

What is claimed:

1. Method for providing a plurality of aligned instructions from an instruction stream having variable-width instructions provided by a memory unit for execution within a pipelined microprocessor comprising a prefetch buffer, said method comprising the steps of:

for each instruction cycle in which the microprocessor issues one or more instructions, in case said prefetch buffer contains invalid data:

a) requesting an instruction stream from the memory unit and storing a plurality of instructions from said instruction stream in said prefetch buffer;

b) storing a size value in said prefetch buffer indicating the number of unissued words remaining in the prefetch buffer;

c) issuing a requested number of instructions from said memory unit and using the validity value to control an aligner that is coupled to the prefetch buffer and the memory unit to align the requested instructions;

d) depending on the number and size of instructions that are issued in the instruction cycle, adjusting the size value in said prefetch buffer;

e1) storing a validity value in said prefetch buffer indicating that said prefetch buffer contains valid data if not all instructions from said prefetch buffer have been issued;

e2) storing a validity value in said prefetch buffer indicating that the prefetch buffer contains invalid data if all instructions from said prefetch buffer have been issued;

in case said prefetch buffer contains valid data:

f) issuing a requested number of instructions from said prefetch buffer and using the validity value and size value to control the aligner to align the requested instructions;

g) depending on the number and size of instructions that are issued in the instruction cycle, adjusting the size value in said prefetch buffer, respectively;

h) changing said validity value to indicate that the prefetch buffer contains invalid data if all instructions from said prefetch buffer have been issued.

2. Method according to claim 1, wherein if in step f) the number of instructions stored in the prefetch buffer is less than the number of requested instructions, the issuing step includes combining instructions from said memory unit with prefetched instructions from said prefetch buffer.

3. Method according to claim 1, wherein indicating the number of unissued words includes storing the number of issued words.

4. Method for providing a plurality of aligned instructions from an instruction stream provided by a memory unit for execution within a pipelined microprocessor comprising a first and second prefetch buffer, said method comprising the steps of:

storing first and second validity values for said first and second prefetch buffers, respectively;

storing a first size value and a second size value in said first and second prefetch buffers, indicating the number of unissued words remaining in the first and second prefetch buffers, respectively;

for each instruction cycle in which the microprocessor issues one or more instructions, in case both of said prefetch buffers contain invalid data:

a) requesting an instruction stream from the memory unit and storing a plurality of instructions from said instruction stream in said first prefetch buffer;

b) issuing a requested number of instructions from said memory unit and using the first and second validity values to control an aligner that is coupled to the first prefetch buffer, the second prefetch buffer and the memory unit to align the requested instructions;

c) depending on the number and size of instructions that are issued in the instruction cycle, adjusting the first size value in said first prefetch buffer, d) setting the first validity value to indicate that said first prefetch buffer contains valid data if not all instructions from said first prefetch buffer have been issued;

e) setting the first validity value to indicate that the first prefetch buffer contains invalid data if all instructions from said first prefetch buffer have been issued;

in case at least one said prefetch buffers contains valid data:

f) issuing a requested number of instructions from said at least one prefetch buffer and using the first and second validity values and the first and second size values to control the aligner to align the requested instructions;

g) depending on the number and size of instructions that are issued in the instruction cycle, adjusting at least one of the size values for said at least one prefetch buffer;

b) setting at least one of said validity values to indicate that said at least one prefetch buffer contains invalid data if all instructions from said at least one prefetch buffer have been issued.

5. Method according to claim 3, wherein if in step f) the number of instructions stored in the first prefetch buffer is less than the number of requested instructions, the issuing step includes combining instructions from the second prefetch buffer with instructions from the first prefetch buffer.

6. Method according to claim 4, wherein before step f) the following steps are inserted:

e1) requesting an instruction stream from the memory unit and storing a plurality of instructions from said instruction stream in another prefetch buffer that contains invalid data;

e2) setting said validity value for said another prefetch buffer to indicate that said another prefetch buffer contains valid data.

7. Method according to claim 4, wherein in step g) additional information will be set in both prefetch buffers indicating which prefetch buffer contains older instructions with respect to an instruction sequence.

8. Method according to claim 4, comprising after step f), in case of one prefetch buffer containing invalid data, the step of requesting an instruction stream from the memory unit and storing a plurality of instructions from said instruction stream in the respective other prefetch buffer.

9. Method according to claim 4 comprising after step c) the step of requesting an instruction stream and storing a plurality of instructions from said instruction stream in the second prefetch buffer.

10. Method according to claim 4, wherein aligning the requested instructions includes setting a plurality of multiplexers according to the first and second validity values and the first and second size values.

11. Method according to claim 4, wherein indicating the number of unissued words includes storing the number of issued words.

* * * * *

UNITED STATES PATENT AND TRADEMARK OFFICE

CERTIFICATE OF CORRECTION

PATENT NO. : 6,981,127 B1
APPLICATION NO. : 09/320833
DATED : December 27, 2005

INVENTOR(S) : Balraj Singh and Venkat Mattela

It is certified that error appears in the above-identified patent and that said Letters Patent is hereby corrected as shown below:

In Column 8, Claim 4, Line 8, (c); Replace:
"prefetch buffer," with
-- prefetch buffer; --

In Column 8, Claim 4, Line 24 (h); Replace:
"b) setting at least one of" with
-- h) setting at least one of --

In Column 8, Claim 5, Line 28; Replace:
"Method according to claim 3," with
-- Method according to claim 4, --

In Column 8, Claim 9, Line 52; Replace:
"Method according to claim 4 comprising" with
-- Method according to claim 4, comprising --

Signed and Sealed this

Twenty-fourth Day of October, 2006

JON W. DUDAS
*Director of the United States Patent and Trademark Office*